Patented Sept. 22, 1925.

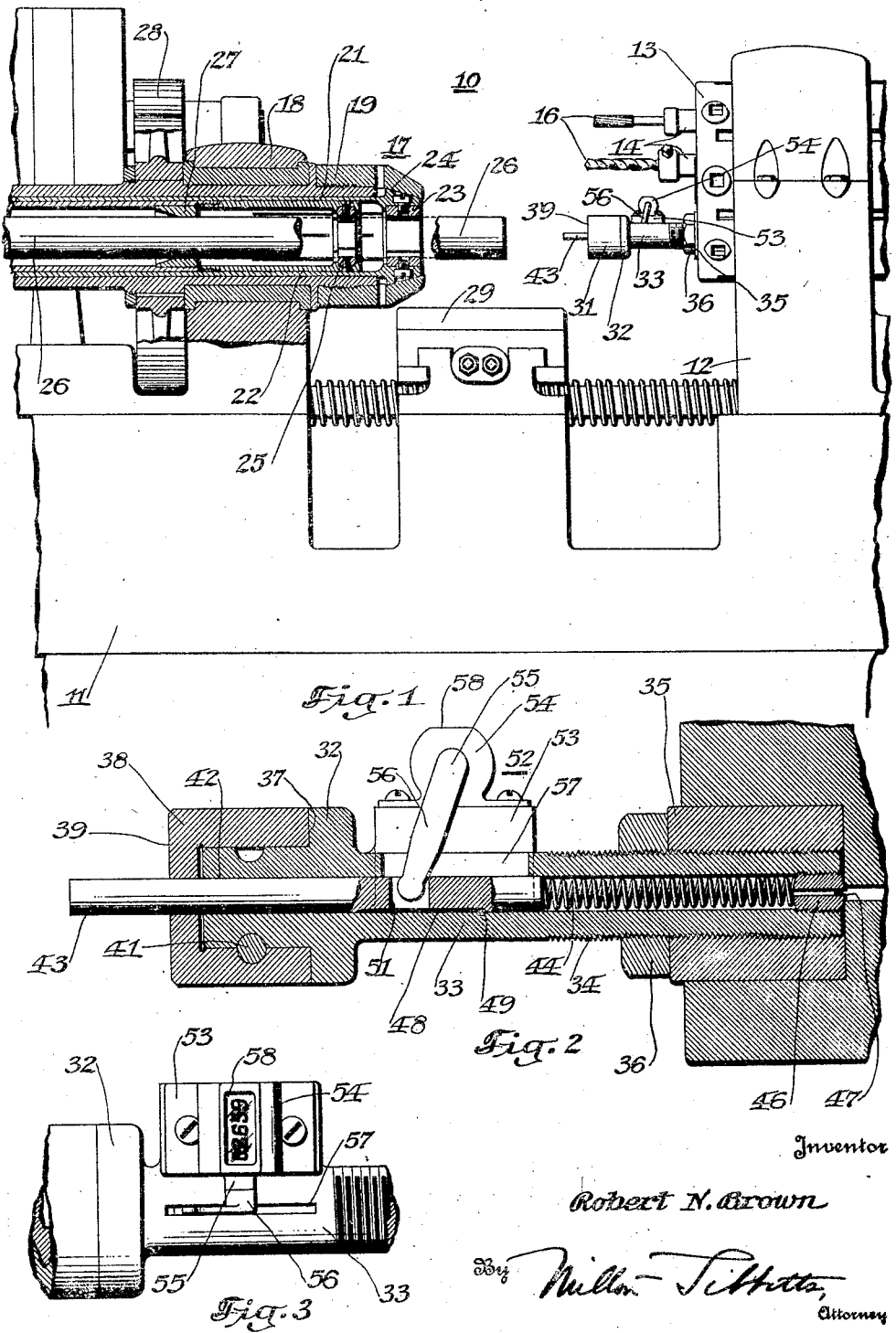

1,554,709

UNITED STATES PATENT OFFICE.

ROBERT N. BROWN, OF DETROIT, MICHIGAN, ASSIGNOR TO PACKARD MOTOR CAR COMPANY, OF DETROIT, MICHIGAN, A CORPORATION OF MICHIGAN.

STOP MECHANISM FOR AUTOMATIC MACHINE TOOLS.

Application filed July 13, 1923. Serial No. 651,438.

*To all whom it may concern:*

Be it known that I, ROBERT N. BROWN, a citizen of the United States, and resident of Detroit, Wayne County, State of Michigan, have invented certain new and useful Improvements in Stop Mechanism for Automatic Machine Tools, of which the following is a specification.

This invention relates to machine tools, particularly of the automatic type. More specifically, it relates to the feeding mechanism of such machines, and it has for an object to provide a stop for use with such feeding mechanism in which the number of complete stock feeding operations shall be counted and recorded.

Another object is to provide such apparatus which shall count only full or completed feeding operations, so that the recorded number thereof shall correspond to the number of pieces of work completed by the machine.

Other objects of the invention will appear from the following description taken in connection with the drawing, which forms a part of this specification, and in which:

Fig. 1 is an elevation, partially in section, of an automatic machine equipped with the invention;

Fig. 2 is a longitudinal vertical section through the stop mechanism, on a larger scale, and Fig. 3 is a partial plan view of the apparatus shown in Fig. 2.

This invention is applicable to any machine in which the stock, in the form of continuous bars or rods, is automatically fed forward to the point of operation. It is illustrated and described as applied to an automatic screw machine of the turret type, but it is to be understood that the invention is not limited in its application to machines of this type.

Referring to the drawing, at 10 is shown an automatic screw machine having a base or table 11 on which the machine proper is mounted. At one end of the table 11 is a suitable pedestal 12, in which a turret 13 is journaled for rotation on its horizontal axis. The turret 13 is provided about its circumference with a number of horizontally disposed tool holders or bushings 14, adapted to support tools 16, suitable for the successive machine operations to be performed. The turret 13 is adapted to be driven in the usual manner and is provided at its rear end with suitable cams (not shown) by which it is advanced and retracted to give the tools 16 the proper predetermined feed motion toward the work.

Mounted on the table 11 opposite the turret 13 is the usual work supporting and feeding mechanism 17, journaled in an appropriate pedestal 18. The feeding mechanism 17 is of the well known type comprising an outer or driving sleeve 19 and inner or operating sleeves 21 and 22, which are connected for rotation together. The sleeve 21 is provided at its ends with suitable chuck jaws 23, operating in the well known manner on the inclined faces 24 at the outer end of the sleeve 19, to grip the stock, and the sleeve 22 is slotted at its end to form spring fingers 25, which press against the stock.

The stock, which is in the form of a bar or rod 26, is fed through the center of the inner sleeve 22, which is provided with suitable guides 27, and is engaged by the chuck jaws 23 in the usual manner. The sleeves 21 and 22 are suitably actuated by any well known mechanism, such as a cam actuated toggle (not shown) to feed the stock 26. When the jaws 23 are opened, the sleeve 22 is advanced and the spring fingers 25 grip the stock with sufficient force to feed it forward. At the end of the feeding stroke, the jaws 23 are closed on the stock 26 by forward motion of the sleeve 21, after which the sleeve 22 is retracted. On this return stroke, the spring fingers 25 slip over the work, which is prevented from moving backwardly by the jaws 23. The sleeves are rotated in any convenient way, as by means of gearing 28, to provide relative rotation between the stock bar 26 and the tool 16.

The operation of this type of machine is well understood in the art to which this invention relates. The stock 26, held in the jaws 23, is rotated while the various tools 16 necessary to perform any desired operation are fed against it and retracted in succession by the turret 13. On the completion of the operation the piece on which the work is complete is cut off from the stock 26 by a suitable tool (not shown) which may be mounted on a traversing table 29 carried by the machine base 11. The sleeve 22 is then retracted, and again advanced, thus taking a new grip on the stock 26 and feeding a fresh portion of it forward in position for the first operation on the piece.

The stock 26 is fed forward against an adjustable stop member 31 conveniently located on the turret face. In this manner feeding of the exact length of stock necessary to form the completed piece, is insured. This stop member 31, best shown in Fig. 2, consists of a head portion 32 and a hollow stem portion 33 threaded at its rear end 34 so that it may be adjustably secured in a bushing 35, mounted in the turret 13. The stem portion 33 is also provided with a lock nut 36 by means of which it is retained in its adjusted position.

The head portion 32 is provided with a circumferential shoulder 37, for cooperation with a removable cap member 38, having a hardened stock arresting face 39 against which the stock 26 is fed. The cap member 38 may be removably retained on the head member 32 by any well known means, such as the pin and slot retainer 41. The head 32 and the cap member 38 are both drilled in axial alinement with the hollow stem 33 for the reception of a plunger 43, the rear end of which extends into the bore of the hollow stem 33 and the forward end of which projects from the face 39. The rear end of the plunger 43 engages a suitable spring 44, located within the hollow stem, and which bears at its rear end against a plug 46, threaded into the hollow stem to provide a spring abutment. The plug 46 is preferably provided with an aperture 47 to prevent the building up of pressure within the hollow stem by the pump action of the plunger 33 therein.

Intermediate the ends of the plunger 43 is a flat face 48, cooperating with a suitable pin 49 placed transversely of the stem 33 and adapted to limit the forward motion of the plunger 43 under action of the spring 44. The plunger 43 is also provided with a notch 51.

Suitably mounted on the stem 33 is a counting and integrating mechanism 52, which includes a lug 53 formed on the side of the stem 33 to support the counter 54. This counter is preferably of the recording type actuated by a suitable shaft 55 through a ratchet (not shown), and is provided with an actuating arm 56, which extends through a suitable slot 57 formed in the stem 33. The arm 56 engages at its lower end in the notch 51 of the plunger 43, and is actuated thereby. The counter 54 is provided with the usual integrating dials 58.

The operation of this device will be readily understood from the foregoing description. As the stock 26 is fed toward the face 39 of the stop member 31, it will first engage the projecting end of the plunger 43 and push it inwardly against the action of the spring 44. In its inward motion, the plunger 43 carries with it the end of the arm 56, thus oscillating the shaft 55 of the counter 54. The counter does not register, however, until at the end of its stroke, when its ratchet mechanism (not shown) releases the dial train from the arm 56. This corresponds to the fully retracted position of the plunger 43, in which position the stock 26 has engaged the face 39 which arrests its feeding motion. In this manner only completed feeding movements of the stock are counted, as an incomplete movement, such as would be occasioned by a lack of sufficient stock in the feeding mechanism, would not move the arm 56 sufficiently to release the dial train.

As the tool for the next operation is carried by the turret into position to engage the work, the plunger 43 is released and is returned by the spring 44 to its protruding position to receive the next advance of the stock.

It will be seen that this invention provides a simple mechanism by which the movement of completed stock feeding operations may be accurately counted, and the count integrated without in any way interfering with the ordinary operation of the stop member.

It will be understood that various forms of the invention other than those described above may be used without departing from the spirit or scope of the invention.

What is claimed is:

1. The combination with a machine tool having automatic stock feeding means, of a stop for the stock, and counting mechanism associated with the stop.

2. The combination with a machine tool having automatic stock feeding means, of a stop member movable to a position to arrest movement of the stock, and counting mechanism associated with the stop member.

3. The combination wtih a machine tool having automatic stock feeding means, of a stop member against which the stock is fed to arrest movement thereof, and means mounted on the stop member adapted to count completed stock feeding operations.

4. The combination with a machine tool having automatic stock feeding means, of a stop member for the stock comprising a head, a shank adapted to adjustably support the head on the machine tool, and counting mechanism associated with said stop operated by the stock and adapted to count complete stock feeding operations.

5. The combination with a machine tool having automatic stock feeding means, of a stop member for the stock comprising a head adjustably supported on said machine tool and adapted to arrest feeding movement of the stock, a plunger slidably mounted in the head, and a counter operatively connected to said plunger 6. The combination with a machine tool having automatic stock feeding means, of a stop member comprising a head having a stock arresting face disposed in the direction from which the stock is fed, a plunger slidably mounted in the head and projecting from said face, and counting mechanism operatively connected to the plunger.

7. The combination with a machine tool having automatic stock feeding means, of a stop member comprising a head and a hollow shank, a plunger slidably mounted in said head and extending into the shank, a spring in the shank adapted to urge the plunger toward the head, and counting and integrating mechanism operatively connected to the plunger.

8. The combination with a machine tool having automatic stock feeding means, of a stop member comprising a head and a hollow shank, a plunger slidably mounted in said head, a spring in the shank adapted to urge the plunger in the direction from which the stock is fed, an apertured plug threaded into the end of the shank to form an abutment for the spring, and counting mechanism connected to the plunger for actuation upon a complete movement thereof.

9. The combination with a machine tool having stock feeding means, of a stop member having a hollow shank and a head, a removable cap member on the head, means adjustably securing the shank to the machine, a plunger slidably mounted in the head and projecting into the hollow shank, and counting mechanism mounted on the shank, said counting mechanism having an actuating arm operable by the plunger.

10. In a machine tool having stock feeding mechanism, the combination of a stop for the stock comprising a head and a hollow shank having a longitudinal slot, a spring actuated plunger mounted in the head, counting mechanism secured to the shank, and an actuating arm for said counting mechanism projecting through the slot in the shank and operable by the plunger.

11. In a machine tool having stock feeding mechanism, the combination of a stop for the stock comprising a head and a hollow shank having a longitudinal slot, a spring actuated plunger mounted in the head having a notch intermediate its ends, counting mechanism secured to the shank, and an actuating arm for the counting mechanism projecting through the slot into engagement with the notch to actuate the counting mechanism upon a full stroke of the plunger.

12. The combination with a machine tool having automatic stock feeding mechanism, of a stop member against which the stock is fed to arrest movement thereof, a plunger slidably mounted in the stop member and adapted to be actuated by the stock and counting mechanism operable from the plunger on full movement thereof.

In testimony whereof I affix my signature.

ROBERT N. BROWN.